(12) United States Patent
Marzetta

(10) Patent No.: US 6,307,882 B1
(45) Date of Patent: Oct. 23, 2001

(54) DETERMINING CHANNEL CHARACTERISTICS IN A SPACE-TIME ARCHITECTURE WIRELESS COMMUNICATION SYSTEM HAVING MULTI-ELEMENT ANTENNAS

(75) Inventor: Thomas L. Marzetta, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/112,853

(22) Filed: Jul. 10, 1998

(51) Int. Cl.$^7$ ............... H04B 3/46; H04B 17/00; H04Q 1/20
(52) U.S. Cl. ............ 375/224; 375/235; 375/347
(58) Field of Search ............... 375/222, 203, 375/235, 347, 144, 224

(56) References Cited

U.S. PATENT DOCUMENTS

| | | | |
|---|---|---|---|
| 4,530,087 | * 7/1985 | Yamamoto | 370/104 |
| 4,577,330 | * 3/1986 | Kavehrad | 375/15 |
| 4,631,734 | 12/1986 | Foschini . | |
| 4,710,944 | * 12/1987 | Nossen | 375/40 |
| 5,787,122 | * 7/1998 | Suzuki | 375/267 |
| 5,831,977 | * 11/1998 | Dent | 370/335 |
| 5,960,039 | * 9/1999 | Martin et al. | 375/267 |

OTHER PUBLICATIONS

R.K. Mueller and G.J. Foschini. ( The Capacity of Linear Channels with Additive Gaussian Noise) Bell System Technical Journal, Jan. 1970, pp. 81–94).*

R.D. Gitlin, J. Salz, and J.H. Winters, ( The Impact of Antenna Diversity on the Capacity of Wireless Communication Systems) IEEE, Transaction on Communications, vol. 42, No. 4, Apr. 1994, pp. 1740–1751.*

G.J. Foschini, Layered Space–Time Architecture for Wireless Communication, Bell Labs Technical Journal Autumn 1996 at pp. 41 et seq.

S.D. Silverstein, Application of Orthogonal Codes to the Calibration of Active Phased Array Antennas, IEEE Transactions on Signal Processing, Jan. 1997 at pp. 206 et seq.

* cited by examiner

Primary Examiner—Stephen Chin
Assistant Examiner—Tony Al-Beshrawi
(74) Attorney, Agent, or Firm—Law Office of Leo Zucker

(57) ABSTRACT

Channel propagation characteristics in a wireless communication system, wherein plural communication links or channels are defined between multiple transmit antenna elements and multiple receive antenna elements, are determined by selecting a matrix of training signals for transmission from the transmit antenna elements, and providing information concerning the selected training signal matrix to a system receiver. The training signals are transmitted from the transmit antenna elements to the receive antenna elements in a determined sequence during a defined training signal time interval, and signals corresponding to the training signals are received via the receive antenna elements. Components of a propagation characteristic matrix for use in discriminating signals transmitted at times other than the training signal time interval, are determined at the receiver as a function of signals received during the training signal time interval and the information concerning the matrix of training signals.

10 Claims, 3 Drawing Sheets

DETERMINING CHANNEL CHARACTERISTICS IN A SPACE-TIME ARCHITECTURE WIRELESS COMMUNICATION SYSTEM HAVING MULTI-ELEMENT ANTENNAS

BACKGROUND OF THE INVENTION

1. Field of the Invention

The present invention relates to wireless communication systems, and, in particular, to a technique for determining individual channel propagation characteristics between a multi-element transmit antenna and a multi-element receive antenna in a space-time architecture wireless communication system.

2. Discussion of the Known Art

A so-called layered, space-time architecture for a wireless point-to-point communication system has been recently proposed. See G. J. Foschini, Layered Space-Time Architecture for Wireless Communication in a Fading Environment When Using Multi-Element Antennas, Bell Labs Technical Journal, Autumn 1996, at 41, et seq. This publication ("Foschini") is incorporated by reference herein. See also co-pending U.S. patent applications Ser. No. 08/673,981 filed Jul. 1, 1996; and Ser. No. 09/060,657 filed Apr. 15, 1998, both of which applications are assigned to the assignee of the present application and invention.

The communication system disclosed in Foschini has a potentially high overall bit-rate which can be realized with one-dimensional coding techniques. The system employs M transmit and N receive antenna elements, assumed to be operating in an environment where propagation is substantially frequency-independent over a system transmission frequency band, and with $N \geq M$. At discrete times t, a transmitter sends M signals $\{s_{t1}, \ldots, s_{tM}\}$, one from each of the M transmit antenna elements. A receiver records N signals $\{x_{t1}, \ldots, x_{tN}\}$, one from each of its N receive antenna elements, such that:

$$x_{tn} = \sum_{m=1}^{M} s_{tm} \cdot h_{mn} + v_{tn}, t = 1, 2, \ldots ; n = 1, 2, \ldots N \quad \text{(Eq. 1)}$$

where $h_{mn}$ is a component of an M×N complex-valued propagation matrix H that is nearly constant with respect to time, and $\{v_{tn}, t=1, \ldots ; n=1, \ldots N\}$ represents additive receiver noise.

The above expression (Eq. 1) represents all quantities at baseband, and all quantities are complex-valued. The actual real-valued signal that is fed into the m-th transmit antenna element at time t is equal to Real $(s_{tm}) \cdot \cos (2\pi f_o t) - \text{Imag} (s_{tm}) \cdot \sin (2\pi f_o t)$; where Real ( ) and Imag ( ) denote the real and the imaginary parts of the complex-valued signal, and $f_o$ is a carrier operating frequency of the system.

The Foschini system assumes that the propagation characteristics H are somehow known to the receiver, but not to the transmitter. These characteristics are then used to discriminate among a number of signals transmitted from the transmit to the receive antenna elements over corresponding "layered" communication channels. Signals transmitted over the channels are recovered, for example, by processes called "nulling" and "cancellation". Foschini does not, however, provide specific details as to how the mentioned propagation characteristics are initially determined at the receiver during system operation.

A method of remotely calibrating active phased array antennas on satellites is disclosed in S. D. Silverstein, "Application of Orthogonal Codes to the Calibration of Active Phased Array Antennas for Communication Satellites", IEEE Transactions on Signal Processing, v.45 (January 1997) at 206, et seq. See also U.S. Pat. No. 4,631,734 (Dec. 23, 1986) entitled "Cross-Polarization Canceler/Equalizer".

SUMMARY OF THE INVENTION

According to the invention, a method of determining channel propagation characteristics in a wireless communication system wherein a number of signal communication channels are defined between a first number of transmit antenna elements associated with a system transmitter and a second number of receive antenna elements associated with a system receiver, includes selecting a matrix of training signals for transmission from the transmit antenna elements, providing information concerning the selected matrix of training signals to the system receiver, and transmitting the matrix of training signals from the transmit antenna elements to the receive antenna elements in a determined sequence during a defined training signal time interval. Signals corresponding to the matrix of training signals are received via the receive antenna elements during the training signal time interval. Components of a channel propagation characteristic matrix for use in discriminating signals transmitted from the transmit to the receive antenna elements at times other than the training signal time interval, are determined according to the signals received during the training signal time interval and the provided information concerning the matrix of training signals.

For a better understanding of the invention, reference is made to the following description taken in conjunction with the accompanying drawing and the appended claims.

DETAILED DESCRIPTION OF THE INVENTION

Figure 1:
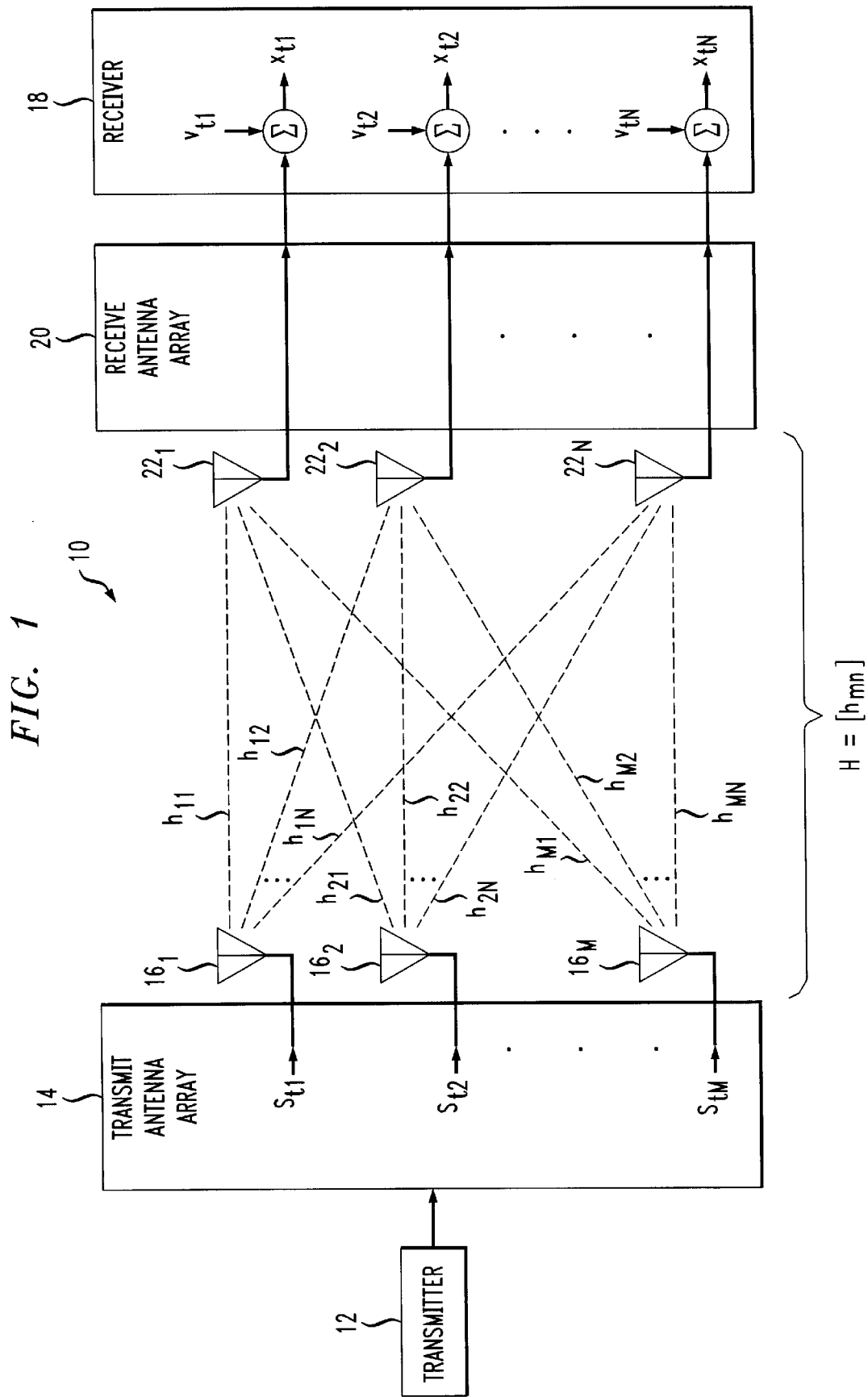
FIG. 1 is a schematic diagram showing propagation of plural signals emitted from corresponding antenna elements of a transmitter array toward a number of antenna elements of a receiver array, in a wireless communication system.

FIG. 1 shows a wireless communication system 10 including a system transmitter 12, a transmit antenna array 14 including M transmit antenna elements $16_m$ (m=1 to M), a system receiver 18, and a receive antenna array 20 including N receive antenna elements $22_n$ (n=1 to N). The system 10 may be one that operates, for example, with a layered space-time architecture as disclosed in the mentioned Foschini publication.

Transmitter 12 comprises a number of transmit signal sources $s_{tm}$ (m=1 to M) each of which is coupled to a corresponding one of the transmit antenna elements $16_m$. Each of the M signals, $s_{t1}, \ldots, s_{tM}$, is applied at the same time to its respective antenna. Thus, if each signal source $s_{tm}$ supplies, for example, a signal digitally coded at a symbol-rate of S symbols/sec, the system 10 transmits a total of M·S symbols/sec. The signals supplied by the transmit signal sources may be unrelated, or they may be derived from one signal stream (e.g., by commutation).

The receiver 18 measures a number of independent receive signals $x_{tn}$ each of which is taken from a corresponding one of the receive antenna elements $22_n$. An additive receive noise component $v_{tn}$ (n=1 to N) becomes present on each receive signal from operation of the receiver itself. See Eq. 1, above.

According to the invention, the receiver 18 determines components $h_{mn}$ of a channel propagation matrix H. Each of the components $h_{mn}$ defines propagation characteristics of a corresponding signal path between a given pair of transmit and receive antenna elements $16_m$, $22_n$; as shown in FIG. 1. The receiver 18 processes the matrix H to detect plural signals that may be transmitted over as many as M different "layered" communication channels by the transmitter 14, for reception by the receiver 18.

Assume that the propagation characteristics are substantially constant with respect to time between any given transmit/receive antenna element pair $16_m$, $22_n$; that during a known training signal time interval prior to data transmission the transmitter 12 transmits a set of pre-determined training signals over the transmit antenna elements $16_m$ in a certain sequence, and that information concerning the pre-determined training signals is provided to the receiver 18 beforehand. In the embodiment described below, the receiver 18 responds via its antenna elements $22_n$ to the training signals to determine the channel propagation matrix H using, e.g., a maximum likelihood mathematical technique. The propagation matrix H is then used by the receiver 18 to discriminate each of the transmitted signals $S_{tm}$ from one another, within the corresponding communication layers or channels of the system 10.

In FIG. 1, let $\{s_{tm}, t=1,2,\ldots; m=1,2,\ldots M\}$ be a complex-valued signal that is fed at time t into transmit antenna element $16_m$ over a unit-symbol interval t. Also, let $\{x_{tn}, t=1,2,\ldots; n=1,2,\ldots, N\}$ be a noisy complex-valued signal that is measured at time t at each receive antenna element $22_n$.

As noted earlier, a mathematical model for the received signal becomes:

$$x_{tn} = \sum_{m=1}^{M} s_{tm} \cdot h_{mn} + v_{tn}; t = 1, 2, \ldots; n = 1, 2, \ldots N \quad \text{(Eq. 1)}$$

where $\{v_{tn}, t=1,2,\ldots; n=1,2,\ldots, N\}$ is noise introduced by the receiver 18, and $\{h_{mn}, m=1,2,\ldots; n=1,2,\ldots, N\}$ is a channel propagation characteristic coefficient (a complex-valued scalar) that represents a propagation characteristic between the m-th transmit antenna element $16_m$ and the n-th receive antenna element $22_n$.

Each $h_{mn}$ is nearly constant over the band of frequencies that the system 10 is using, and is nearly constant over time. Any antenna gain or directivity, and any gain variations in the transmitter or receiver circuits, can be absorbed in each coefficient $\{h_{mn}\}$.

In accordance with the invention, operation of the communication system 10 occurs in two stages. In the first stage (referred to as a "training signal time interval"), training signals are sent for T symbol intervals (typically $T \geq M$). The training signals are pre-defined as explained below, and all their essential characteristics are provided to the receiver 18 beforehand, as well as to the transmitter 12. From signals received via the receive antenna elements $22_n$ over the training signal time interval, the receiver 18 then determines the propagation coefficients $\{h_{mn}\}$ of the M→N transmission channel links, as will also be described below.

In the second stage of system operation, the transmitter 12 transmits message data or other information to the receiver 18 over the multi-antenna links of the system 10, by methods disclosed in, for example, the mentioned Foschini publication wherein the propagation coefficients $\{h_{mn}\}$ are assumed to be known by the receiver 18.

Using vector notation, Eq. 1 above can be rewritten to show a signal measured at the n-th receive antenna element $22_n$ during a training signal time interval of T symbol length, as:

$$\underline{x}_n = S \cdot \underline{h}_n + \underline{v}_n; n=1,2,\ldots, N \quad \text{(Eq. 2)}$$

where:

$$\underline{x}_n = \begin{bmatrix} x_{1n} \\ x_{2n} \\ \vdots \\ x_{Tn} \end{bmatrix} \quad \begin{array}{l} (T \times 1 \text{ column vector}) \\ n = 1, 2, \ldots, N \end{array}$$

$$\underline{v}_n = \begin{bmatrix} v_{1n} \\ v_{2n} \\ \vdots \\ v_{Tn} \end{bmatrix} \quad \begin{array}{l} (T \times 1 \text{ column vector}) \\ n = 1, 2, \ldots, N \end{array}$$

$$\underline{h}_n = \begin{bmatrix} h_{1n} \\ h_{2n} \\ \vdots \\ h_{Mn} \end{bmatrix} \quad \begin{array}{l} (M \times 1 \text{ column vector}) \\ n = 1, 2, \ldots, N \end{array}$$

$$S = \begin{bmatrix} S_{11} & S_{12} & & S_{1M} \\ S_{21} & S_{22} & \ldots & S_{2M} \\ \vdots & \vdots & & \vdots \\ S_{T1} & S_{T2} & & S_{TM} \end{bmatrix} \quad (T \times M \text{ matrix})$$

Figure 2:
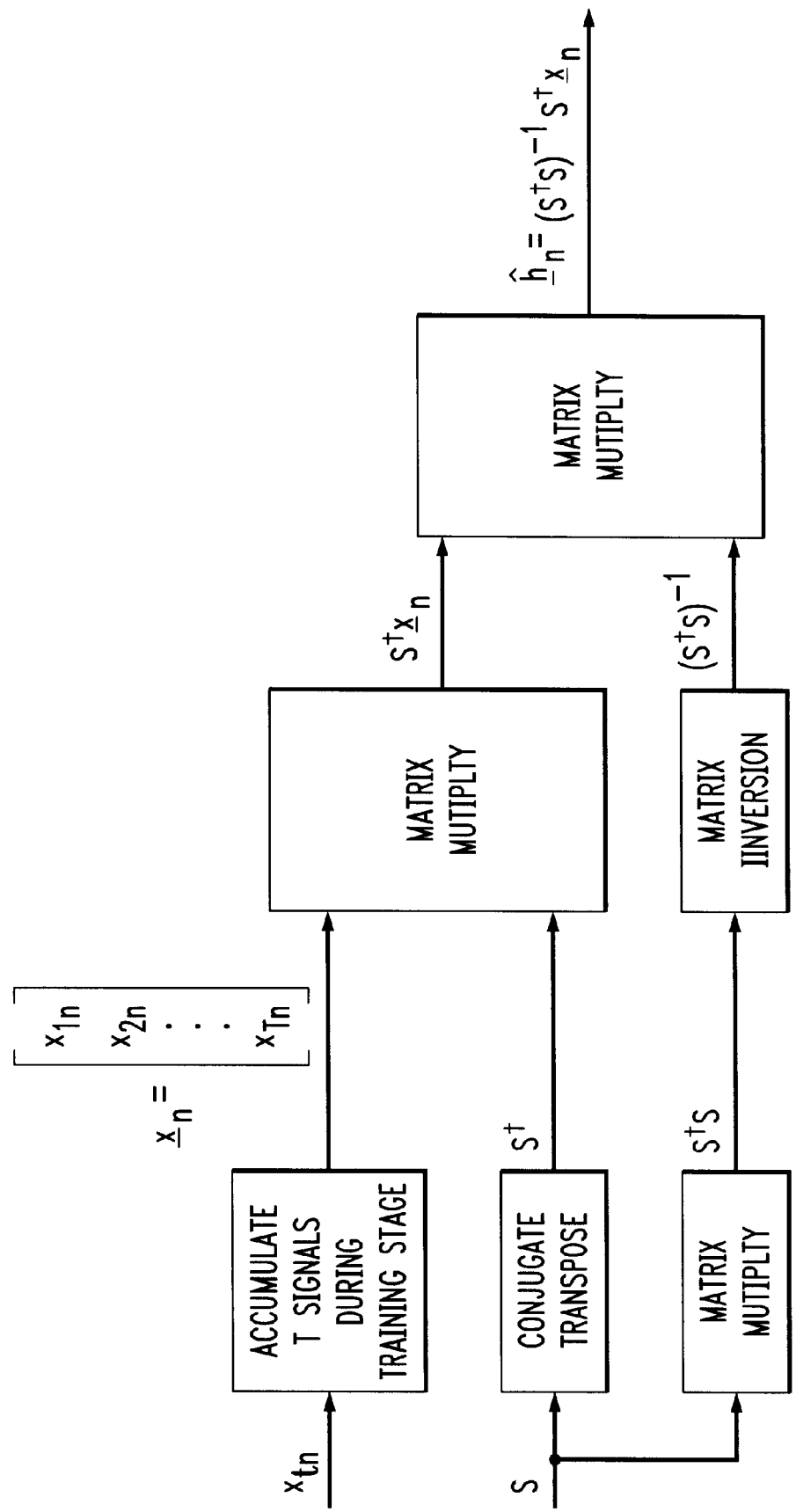
FIG. 2 is a block diagram of a processing scheme for determining channel propagation characteristics using a defined matrix of training signals from the transmitter array, according to the invention.

As mentioned, in accordance with the invention, all terms of the matrix S of training signals are made known to the receiver 18. Upon receiving signals corresponding to the matrix S of training signals, the receiver derives an estimate for $\underline{h}_n$, denoted by $\hat{\underline{h}}_n$ for n=1,2,\ldots, N; using one of several well-known estimation techniques. FIG. 2 shows, for example, an application of the method of least squares wherein the receiver 18 chooses $\hat{\underline{h}}_n$ to minimize the expression $$\sum_{t=1}^{T} \left| x_{tn} - \sum_{m=1}^{M} s_{tm} \cdot \hat{h}_{mn} \right|^2, n = 1, 2, \ldots, N \quad \text{(Eq. 3)}$$

Using vector notation, Eq. 3 can be rewritten as:

minimize over $\hat{\underline{h}}_n$: $(\underline{x}_n - S\hat{\underline{h}}_n)^\dagger (\underline{x}_n - S\hat{\underline{h}}_n)$, (Eq. 4)

where the superscript "†" denotes "conjugate transpose".

The minimization of Eq. 4 can be performed by any of several well-known algorithms including, for example, a Q–R factorization of S, a singular-value decomposition of S, or the normal equations method. The normal equations method yields the estimate in the form $$\hat{\underline{h}}_n = (S^\dagger S)^{-1} S^\dagger \cdot \underline{x}_n; n=1,2,\ldots, N \quad \text{(Eq. 5)}$$

The matrix S of training signals should be carefully chosen to assure satisfactory performance of the obtained estimator of Eq. 5, for ease of implementation, and to comply with power restrictions for the system transmitter 12. The estimator of Eq. 5 requires the inversion of the M×M matrix $S^\dagger S$. Thus, to avoid amplifying receiver noise and computational round-off errors, S should be chosen so that $S^\dagger S$ is non-singular and well-conditioned. This is achieved, in part, by making $T \geq M$.

Substituting the noisy signal model of Eq. 2 into the estimator formula of Eq. 5, one obtains:

$$\underline{h}\hat{\underline{h}}_n = (S^\dagger S)^{-1} S^\dagger \cdot (S\underline{h}_n + \underline{v}_n) = (S^\dagger S)^{-1} S^\dagger$$

$$S\underline{h}_n + (S^\dagger S)^{-1} S^\dagger \underline{v}_n = \underline{h}_n + (S^\dagger S)^{-1} S^\dagger \underline{v}_n =$$

$$\underline{h}_n + \underline{h}\hat{\underline{h}}_n; \; n=1,2,\ldots,N \quad \text{(Eq. 6)}$$

The second term in Eq. 6, $\underline{h}\hat{\underline{h}}_n$, represents an estimation error due to the receiver noise. This estimation error can be reduced by choosing S carefully. The M×T matrix $[(S^\dagger S)^{-1}S^\dagger]$ should ideally be as small as possible. One useful measure of the magnitude of this matrix is the sum of the square-magnitudes of the component elements of the matrix;

$$\sum_{m=1}^{M}\sum_{t=1}^{T} |[(S^+S)^{-1}S^+]_{mt}|^2 = \sum_{m=1}^{M} |[(S^+S)^{-1}]_{mm}|^2 \quad \text{(Eq. 7)}$$

It is desirable to choose S to minimize Eq. 7; however, transmitter power constraints must be observed. A reasonable power constraint is one in which the average power fed into each transmit antenna element is less than or equal to a specified power P;

$$(1/T \cdot M) \cdot \sum_{t=1}^{T}\sum_{m=1}^{M} |s_{tm}|^2 \leq P \quad \text{(Eq. 8)}$$

It can be shown that Eq. 7 is minimized, subject to the power constraint of (Eq. 8), if $$S^\dagger S = T \cdot P \cdot I_m \quad \text{(Eq. 9)}$$

where $I_m$ is the M×M identity matrix;

$$[I_M]_{ij} = \begin{cases} 1 \text{ if } i = j \\ 0 \text{ if } i \neq j \end{cases} \quad \text{(Eq. 10)}$$

If S is written in terms of its M column vectors, $$S = [s_1 | s_2 | \ldots | s_m], \text{ then Eq. 9 becomes} \quad \text{(Eq. 11)}$$

$$\underline{s}_i^\dagger \cdot \underline{s}_j = \sum_{t=1}^{T} s_{ti}^\dagger \cdot s_{tj} = \begin{cases} T \cdot P \text{ if } i = j \\ 0 \text{ if } i \neq j \end{cases}$$

That is, the time-dependent training signals that are fed into the M transmit antenna elements are mutually orthogonal over the time interval $\{t=1,2,\ldots,T\}$, and they have equal energies over this same time interval. There are a wide variety of orthogonal signals that can be used, provided that $T \geq M$. For example, if $T \geq M$, one can use $$S_{tm} = \begin{cases} \sqrt{M \cdot P} & \text{if } t = m \\ 0 & \text{if } t \neq m \end{cases} \quad \text{(Eq. 12)}$$

where, at time t, the total available power is sent to exactly one transmit antenna element (e.g., the t-th element). If T is a power-of-two, then Walsh functions proportional to ±1 valued square-waves could be used. For example, with T=4 and M=2;

$$S = \sqrt{P} \cdot \begin{bmatrix} 1 & 1 \\ 1 & -1 \\ 1 & 1 \\ 1 & -1 \end{bmatrix}$$

These signals divide the power equally among all transmit antenna elements at all times.

Yet another example of orthogonal signals are columns from a T×T discrete Fourier transform matrix, $$S_{tm} = \sqrt{P} \cdot e^{i2\pi(t-1)(m-1)/T}; \; t=1, 2, \ldots, T \; m=1, 2, \ldots, M$$

Like the Walsh functions, the Fourier signals divide the power equally among all transmit antenna elements at all times.

Another advantage of using orthogonal training signals (e.g., signals that satisfy Eq. 9) is that no matrix inversion is required to implement the estimator of Eq. 5. That is, Eq. 5 becomes:

$$\underline{h}\hat{\underline{h}}_n = (1/T \cdot P) \cdot S^\dagger \cdot x_n, \; n=1,2,\ldots,N.$$

The following is an example of how, once having derived the propagation matrix H, the receiver 18 can discriminate or detect the plural signals $s_{tn}$ emitted from the transmit antenna elements $16_m$, in response to signals received at the receive antenna elements $22_n$. In one scheme, the receiver 18 factors H in the form H=RQ, where Q is an N×N unitary matrix, and R is an M×N lower-triangular matrix whose diagonal elements are real-valued and non-negative; $r_{mn}=0$ if n>m. The factors Q and R are used for the two earlier-mentioned operations to be carried out at the receiver 18, namely, nulling and cancellation.

The nulling operation includes multiplying the vector of received signals at each symbol time t by the conjugate transpose of Q. The received signal, in its new coordinate system, becomes $[y_{t1} \ldots y_{tN}] = [x_{t1} \ldots x_{tN}]Q^\dagger$. The received signal is then related to the transmitted signal through the equivalent triangular matrix R and the components of the additive receiver noise $[w_{t1} \ldots w_{tN}] = [v_{t1} \ldots V_{tN}] \cdot Q^\dagger$, in the new coordinate system;

$$y_{tn} = \begin{cases} \sum_{m=n}^{M} s_{tm} r_{mn} + w_{tn}, & \text{if } n = 1, 2, \ldots, M \\ w_{tn}, & \text{if } n = (M+1), \ldots, N \end{cases} \quad \text{(Eq. 13)}$$

Since the nulling operation involves multiplying by a unitary matrix (whose columns are orthonormal), the noise is not amplified by the operation, and the noise variance is not increased. In the new coordinate system, $\{y_{tM+1}, \ldots, y_{tN}\}$ depend only on noise, and so may be discarded.

Although the triangularized propagation matrix is simpler than a rectangular one, there are still off-diagonal terms to contend with; $y_{tm}$ depends not only on $s_{tm}$, but also on $\{s_{tm+1} \ldots S_{tM}\}$. The cancellation operation uses highly reliable estimates of the interfering components of $S_t$ that are associated with the off-diagonal element of R, to subtract their effect within the triangular system of equations, $$z_{tn} = y_{tn} - \sum_{m=n+1}^{M} r_{mn} \cdot \hat{s}_{tm} = r_{nn} \cdot s_{tn} + w_{tn}, \quad M-1 \geq n \geq 1. \quad \text{(Eq. 14)}$$

The cancellation operation proceeds as follows. For n=M, (Eq. 13) becomes $y_{tM} = S_{tM} r_{MM} + w_{tM}$, so the transmitted signal $s_{tM}$ can be recovered without interference from the other transmitted signals. After decoding, the message bits associated with $s_{tM}$ for a multiplicity of times t, are recovered correctly with a high probability, and a highly accurate signal estimate $\hat{s}_{tM}$ is constructed.

For n=M−1, Eq. 13 indicates that $s_{tM}$ interferes with the reception of $s_{tM-1}$. This interference is removed by implementing the cancellation operation of Eq. 14 for n=(M−1). At this point, $s_{tM-1}$ is received without interference, decoded, and a highly accurate signal estimate $s_{tM-1}$ is constructed for use in the remaining cancellation operations.

In effect, the cancellation operation renders the triangularized propagation matrix diagonal. The reliability of the estimates $\{\hat{s}_{t2}, \ldots \hat{s}_{tM}\}$ is ensured with a very high probability by using error correcting codes to decode the associated message bits, and then to reconstruct the transmitted signal.

In general, for each symbol period the nulling operation requires about M·N additions and multiplications, and the cancellation operation requires about $M^2/2$ additions and multiplications. For example, suppose that M=N=8, and that the symbol rate is 30 KHz. Then together, nulling and cancellation require about three-million operations per second which is well within the capability of commercially available digital signal processing (DSP) integrated circuit chips. For this example, a total of 8×30,000=240,000 symbols per second are transmitted, and each symbol carries multiple bits of information. If 16-PSK (phase-shift keying) were employed, each symbol would carry $\log_2 16 = 4$ bits of information, and the total bit rate would be 4×240,000=960,000 bits/second. Foschini has shown that, if the signal-to-noise ratio is 18 dB, this unusually high bit rate can be sustained with probability 0.99, subject to some assumptions concerning the elements of the propagation matrix (specifically, $h_{mn}$ are independent, zero-mean, identically distributed, complex Gaussian elements). The spectral bandwidth of the overall transmission link is only 30 KHz.

Outage Probability Due to Channel Estimation Error

The nulling and cancellation operations nominally produce M uncoupled communication subchannels $\{z_{t1}, \ldots, z_{tM}\}$, according to Eq. 14. The effect of significant errors in estimating the propagation matrix H is to degrade the effectiveness of the nulling and cancellation operations, according to the following equation:

$$[Z_{t1} \ldots z_{tM}] = [s_{t1} \cdot r_{11} \ldots s_{tM} \cdot r_{MM}]_{[w_{t1} \ldots w_{tM}]} - [s_{t1} \ldots s_{tM}] \cdot \tilde{H} \cdot Q_1^\dagger \quad \text{(Eq. 15)}$$

where $Q_1$ is the M×N matrix formed from the first M rows of the matrix Q defined by the Q–R factorization $\hat{H} = R \cdot Q$. When the estimation error $\tilde{H}$ is significantly large, then the subchannels become contaminated with cross-talk.

It is desirable to choose a sufficiently long training signal interval T, so that the magnitude of the third term in Eq. 15 (i.e., crosstalk) is typically small compared with the magnitude of the second term (i.e., noise). Under some reasonable operating conditions (e.g., where the components of H are independent, identically distributed, zero-mean complex Gaussian random variables, and the receiver noise components are similarly distributed), then using orthogonal training signals according to Eq. 9 one can calculate the training signal time interval T such that the crosstalk variance is smaller than the noise variance by some specified factor β. The required training signal time interval is approximately proportional to the number of transmit antenna elements M, and is independent of the number of receive antenna elements N.

Consider that an outage event, $O_H$, occurs if the variance of any of the M components of the third term of Eq. 15 exceeds the noise variance. The probability of such an outage can be represented in terms of a standard probability distribution of a chi-square random variable with 2M degrees of freedom:

$$\Pr\{O_H\} = 1 - [1 - \Pr\{\chi^2_{2M} \geq 2\beta T\}]^M \quad \text{(Eq. 16)}$$

Figure 3:
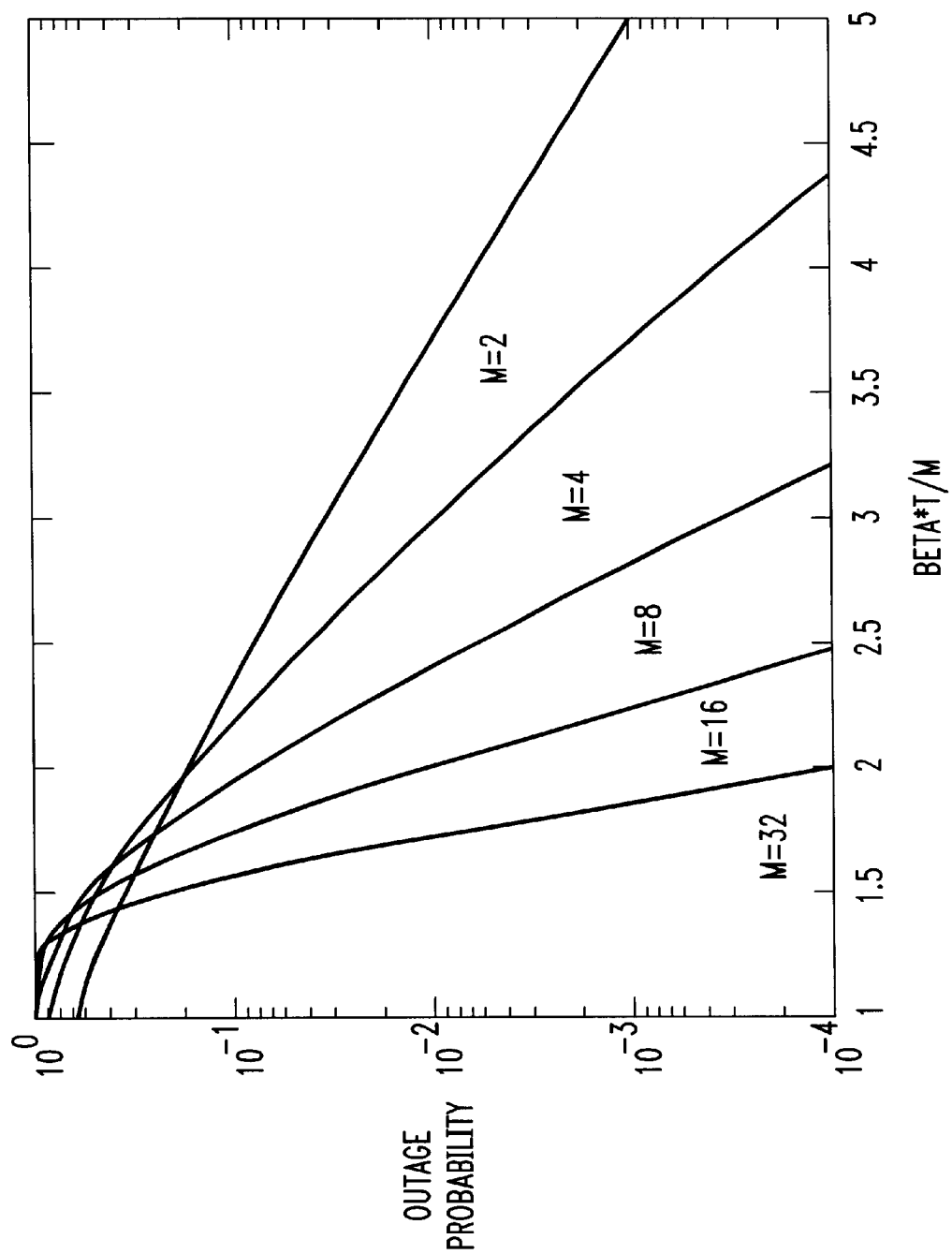
FIG. 3 shows plots of system outage probabilities at specified levels of signal crosstalk.

From the above formula, the required training signal time interval can be found in terms of the number of transmit antenna elements M, and the specified tolerance factor β (typically 0.5 or 0.1). FIG. 3 shows plots of the outage probability according to Eq. 16, as a function of β·T/M, for M=2, 4, 8, 16 & 32.

The system transmitter 12 sends data at a chosen bit-rate that is also known to the receiver, knowing only the statistics of a random propagation matrix. There is some outage probability that the channel cannot support the bit-rate even if the system receiver has perfect knowledge of the propagation matrix. The above analysis indicates that channel estimation error can induce a second type of outage event. The two types of outage are virtually independent; the former, computed by Foschini, depends on the value of the random propagation matrix, while the latter (e.g., Eq. 16) depends on the value of the channel estimation error, which, in turn, depends on the value of receiver noise that is associated with the training signals. The probability of an outage event occurring is upper-bounded by the sum of the two individual outage probabilities.

EXAMPLE

Consider a case of eight receive and eight transmit antenna elements (M=N=8), operating with a signal-to-noise (S/N) ratio of 21 dB. It can be shown that the system 10 yields a capacity of 42.4 bits per second per Hertz overall, with an outage probability of 0.1 when the receiver has perfect knowledge of the propagation matrix. If the probability of an outage due to channel estimation error is to be only 0.05 or less, it can be shown that such an outage probability is achieved if 2βT=33.6. Assume that β is chosen to be 0.1 (i.e., with probability 0.95, the M crosstalk variances are 10 dB below the variance of the receiver noise). The required training signal time interval is then T=168 symbol periods.

To maintain a total outage probability of 0.1, and to compensate for an effective decrease in S/N ratio due to the crosstalk, the system 10 should operate at an overall bit rate lower than 42.4. The crosstalk is 10 dB below the receiver noise, so the effective S/N is reduced from 21 dB to 20.6 dB. At the reduced S/N of 20.6 dB, the system having perfect knowledge of the propagation matrix, yields a capacity of 40.5 bits per second per Hertz, with an outage probability of 0.05.

In sum, with knowledge of the true propagation matrix, system capacity is 42.4 bits per second per Hertz with an outage probability of 0.1. Using an estimated propagation matrix H based on a training signal time interval of 168 symbols (equivalent to 21 symbols per antenna element if M=N=8), the capacity is 40.5 bits per second per Hertz with a total outage probability of 0.1. The time needed to estimate the propagation matrix increases only linearly with the number of transmit antenna elements, and is independent of the number of receive antenna elements.

While the foregoing description represents a preferred embodiment of the invention, it will be obvious to those skilled in the art that various changes and modifications may be made, without departing from the spirit and scope of the invention pointed out by the following claims.

What I claim is:

1. A method of determining channel propagation characteristics in a communication system wherein a number of communication channels are defined between a first number of transmit antenna elements associated with a system transmitter and a second number of receive antenna elements associated with a system receiver, comprising:

selecting a matrix of training signals for transmission from the transmit antenna elements;

providing information concerning component terms of the selected matrix of training signals to the system receiver;

transmitting the component terms of the matrix of training signals at a given symbol rate from the transmit antenna elements to the receive antenna elements in a determined sequence during a training signal time interval, and transmitting other information signals from the transmit to the receive antenna elements at times other than the training signal time interval;

defining the training signal time interval to span a number of symbol intervals that are at least equal to the number of transmit antenna elements;

receiving the transmitted component terms of the matrix of training signals via the receive antenna elements during said training signal time interval;

determining member terms of a channel propagation characteristic matrix according to signals received by the receive antenna elements during the training signal time interval, and the information provided to the system receiver concerning the component terms of the selected matrix of training signals; and discriminating the other information signals transmitted from the transmit antenna elements to the receive antenna elements at times other than said training signal time interval, according to the determined member terms of the channel propagation characteristic matrix.

2. The method of claim 1, wherein said determining step comprises applying the method of least squares.

3. The method of claim 1, wherein the selecting step comprises selecting the matrix of training signals to be mutually orthogonal over the training signal time interval.

4. The method of claim 1, wherein the selecting step comprises selecting columns of the matrix of training signals to have substantially equal energies over the training signal time interval.

5. A method of determining channel propagation characteristics in a communication system wherein a number of communication channels are defined between a first number of transmit antenna elements associated with a system transmitter and a second number of receive antenna elements associated with a system receiver, comprising:

selecting a matrix of training signals for transmission from the transmit antenna elements;

providing information concerning the selected matrix of training signals to the system receiver;

transmitting the matrix of training signals from the transmit antenna elements to the receive antenna elements in a determined sequence during a defined training signal time interval;

receiving the transmitted matrix of training signals via the receive antenna elements during said training signal time interval; and determining member terms of a channel propagation characteristic matrix for use in discriminating signals transmitted from the transmit antenna elements to the receive antenna elements at times other than said training signal time interval, according to the signals received via the receive antenna elements during the training signal time interval and the information relating to the selected matrix of training signals;

wherein the selecting step comprises selecting the matrix of training signals to correspond to Walsh functions proportional to ±1 valued square-waves.

6. A method of determining channel propagation characteristics in a communication system wherein a number of communication channels are defined between a first number of transmit antenna elements associated with a system transmitter and a second number of receive antenna elements associated with a system receiver, comprising:

selecting a matrix of training signals for transmission from the transmit antenna elements;

providing information concerning the selected matrix of training signals to the system receiver;

transmitting the matrix of training signals from the transmit antenna elements to the receive antenna elements in a determined sequence during a defined training signal time interval;

receiving the transmitted matrix of training signals via the receive antenna elements during said training signal time interval; and determining member terms of a channel propagation characteristic matrix for use in discriminating signals transmitted from the transmit antenna elements to the receive antenna elements at times other than said training signal time interval, according to the signals received via the receive antenna elements during the training signal time interval and the information relating to the selected matrix of training signals;

wherein the selecting step comprises selecting the matrix of training signals to correspond to columns from a TxT discrete Fourier transform matrix wherein T is a number of symbol intervals defining the training signal time interval.

7. The method of claim 6, including defining the training signal time interval by a predetermined number of symbol intervals which number is at least equal to the number of transmit antenna elements.

8. The method of claim 5, wherein said determining step comprises applying the method of least squares.

9. The method of claim 6, wherein said determining step comprises applying the method of least squares.

10. The method of claim 5, including defining the training signal time interval by a predetermined number of symbol intervals which number is at least equal to the number of transmit antenna elements.

* * * * *